(12) United States Patent
Lee et al.

(10) Patent No.: US 6,922,841 B2
(45) Date of Patent: Jul. 26, 2005

(54) APPARATUS FOR CONNECTING AND DRIVING OPTICAL PICK-UP

(75) Inventors: Nan-Ching Lee, Kaohsiung (TW); Chiao-Fan Huang, Shinjuang (TW)

(73) Assignee: Benq Corporation, Taoyuan (TW)

( * ) Notice: Subject to any disclaimer, the term of this patent is extended or adjusted under 35 U.S.C. 154(b) by 164 days.

(21) Appl. No.: 10/368,917

(22) Filed: Feb. 19, 2003

(65) Prior Publication Data
US 2003/0156528 A1 Aug. 21, 2003

(30) Foreign Application Priority Data

Feb. 21, 2002 (TW) ........................................ 91103008 A
Dec. 13, 2002 (TW) ........................................ 91136213 A

(51) Int. Cl.[7] .............................................. G11B 5/55
(52) U.S. Cl. ..................... 720/677; 720/679; 360/267.4
(58) Field of Search ................................. 720/677, 679, 720/663, 665, 664; 360/267.4–267.8

(56) References Cited

U.S. PATENT DOCUMENTS

| | | | | |
|---|---|---|---|---|
| 5,191,575 A | * | 3/1993 | Kido ........................... | 369/223 |
| 5,535,076 A | * | 7/1996 | Kamioka et al. ......... | 360/267.4 |
| 5,889,638 A | * | 3/1999 | Kabasawa et al. ........ | 360/261.3 |
| 5,912,789 A | * | 6/1999 | Konno et al. ............. | 360/267.6 |
| 6,058,098 A | * | 5/2000 | Kato ........................... | 720/663 |
| 6,317,287 B1 | * | 11/2001 | Yano et al. .................. | 360/260 |
| 6,700,859 B2 | * | 3/2004 | Oono et al. .................. | 369/223 |

\* cited by examiner

*Primary Examiner*—Brian E. Miller
(74) *Attorney, Agent, or Firm*—Snell & Wilmer L.L.P.

(57) ABSTRACT

The present invention relates to an apparatus for connecting a transmission device to an optical pick-up. The transmission device includes a connecting unit and a lead screw and a driving unit. The connecting unit includes a main portion, an elastic portion, a tooth-like portion and a restriction portion. The restriction portion limits the elastic portion to move within a range of a first value. The lead screw engages with the tooth-like portion. A maximum engagement depth between the lead screw and the tooth-like portion is a second value. The second value is larger than the first value to prevent the lead screw and the tooth-like portion from disengaging.

15 Claims, 7 Drawing Sheets

US 6,922,841 B2

APPARATUS FOR CONNECTING AND DRIVING OPTICAL PICK-UP

This application claims priority of Taiwan Patent Application No. 091103008 filed on Feb. 21, 2002 and No. 091136213 filed on Dec. 13, 2002.

FIELD OF INVENTION

The present invention relates to a connecting unit, and more particularly, to a connecting unit especially used with an optical pick-up.

BACKGROUND OF THE INVENTION

An optical pick-up is a device for recording or reproducing the information on the optical disc, such as a digital video disk (DVD) or a compact disk (CD). The information recorded on the disc is read by the optical pick-up which projects laser beams on recording pits of the optical disc and receives the reflective laser beam.

Generally, when the optical pick-up reads the information recorded on the optical disc, the optical disc is rotated and the optical pick-up moves along the radial direction of the optical disc so that the optical pick-up can read the entire information on the optical disc. As shown in FIG. 4, a housing 9 supporting the optical pick-up (not shown in FIG. 4) is connected to a connecting unit 7. And, the connecting unit 7 has a tooth-like portion 1. The tooth-like portion 1 engages with the threads of a lead screw 3 to drive and guide the connecting unit 7 to move along the lead screw 3. Therefore, the optical pick-up is moved by the connecting unit 7.

The tooth-like portion 1 must engage with the lead screw 3 so that the optical pick-up will move smoothly. Conventionally, there is an elastic unit 5 disposed between the tooth-like portion 1 and the connecting unit 7. The elastic element 5 provides the tooth-like portion 1 with the elasticity to resist the lead screw 3 so that the tooth-like portion 1 engages tightly with the lead screw 3. However, the foregoing still can't prevent the tooth-like portion 1 and the lead screw 3 from disengaging with each other while experiencing the bigger shake or impact.

SUMMARY OF THE INVENTION

The present invention provides an apparatus for connecting a transmission device to an optical pick-up. The transmission device includes a connecting unit, a lead screw, a driving unit and a housing. The driving unit drives the lead screw to rotate. The housing supports the optical pick-up. The connecting unit connects the housing to the lead screw to drive the housing so that the optical pick-up moves along the lead screw.

The connecting unit of one embodiment according to the present invention has a main portion, an elastic portion, a tooth-like portion, a space and a restriction portion. The elastic portion extends from the main portion along a first direction. The space is formed between the elastic portion and the main portion. The tooth-like portion engages with the lead screw. The restriction portion extends from the elastic portion to limit the elastic portion to move within a range of a first value along a second direction opposite to the first direction. A maximum engagement depth between the lead screw and the tooth-like portion is a second value. The second value is larger than the first value to prevent the lead screw and the tooth-like portion from disengagement.

The connecting unit of another exemplary embodiment has a main portion, an extended portion, a tooth-like portion, and a fixing device. A space is formed between the extended portion and the main portion. The tooth-like portion protrudes from the extended portion. The fixing device protrudes from the extended portion. This exemplary embodiment further includes an elastic member within the space. The fixing device prevents the elastic member from coming off the space. Hereinafter the term "optical pick-up supporting apparatus" includes the connecting unit, the lead screw, and the elastic member.

One aspect of exemplary embodiments of the present invention is to provide a simple mechanism for an optical pick-up so that the lead screw and the tooth-like portion engage better with each other.

Another aspect of exemplary embodiments of the present invention further is to provide a restriction portion to prevent the lead screw and the tooth-like portion from disengaging while experiencing bigger shake or impact.

This and other aspects of the present invention will become clear to those of ordinary skill in the art after having read the following detailed description of the preferred embodiment which is illustrated in the various figures and drawings.

DETAILED DESCRIPTION

Figure 1:
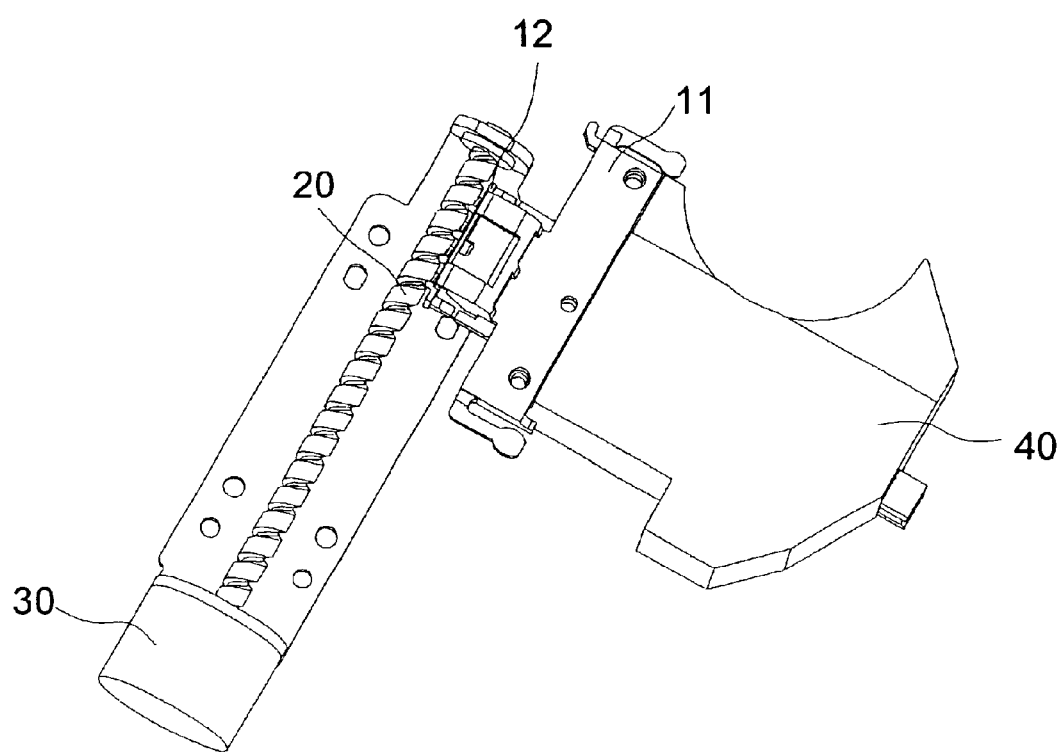
FIG. 1 is a view of an exemplary embodiment according to the present invention.

FIG. 1 is a view of an exemplary transmission device and an exemplary housing according to the present invention. The housing 40 supports an optical pick-up (not shown). The transmission device for moving the housing includes a connecting unit 10, a lead screw 20 and a driving unit 30. The driving unit 30 drives the lead screw 20 to rotate. The connecting unit 10 connects the housing 40 to the lead screw 20. Therefore, the connecting unit 10 drives the housing 40 to move and the optical pick-up then moves with the housing along the lead screw 20.

Figure 2A:
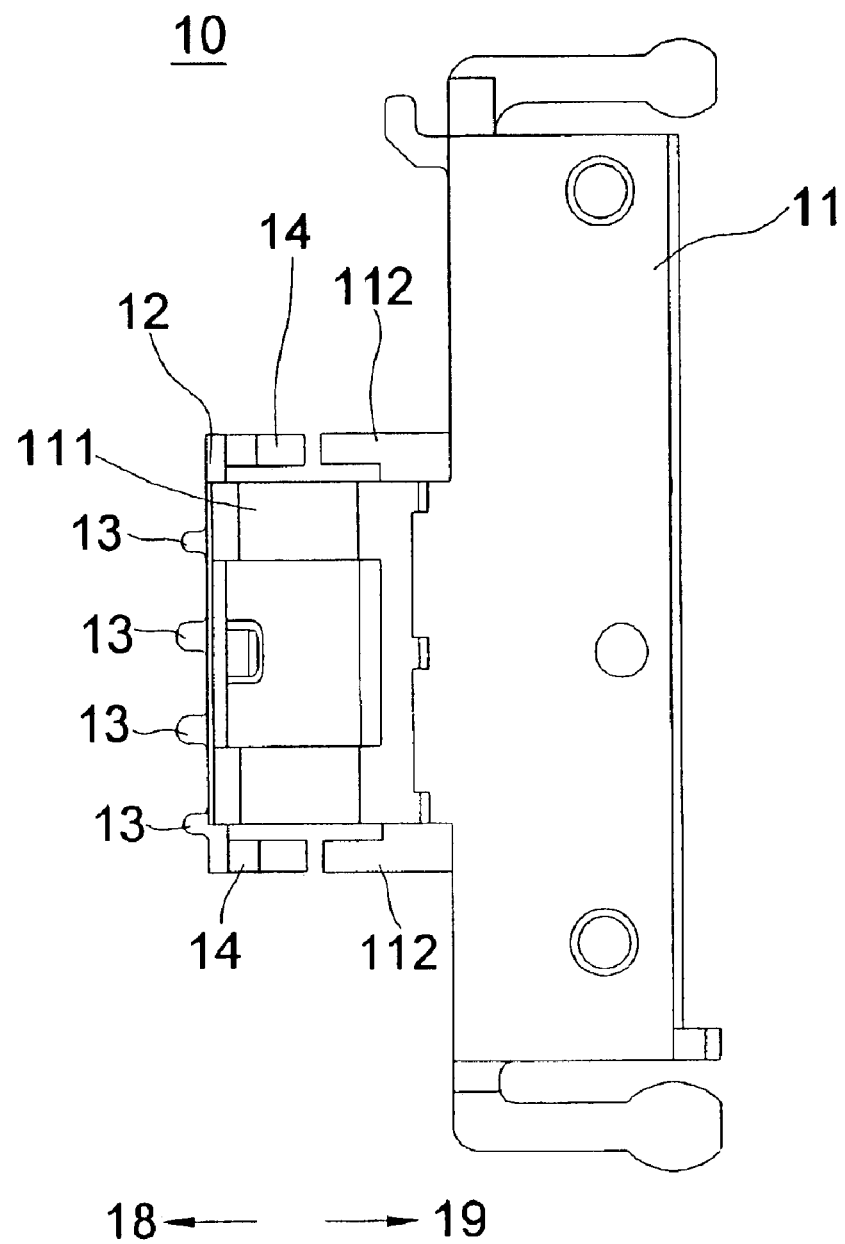
FIG. 2a is a plan view of an exemplary connecting unit.
Figure 2B:
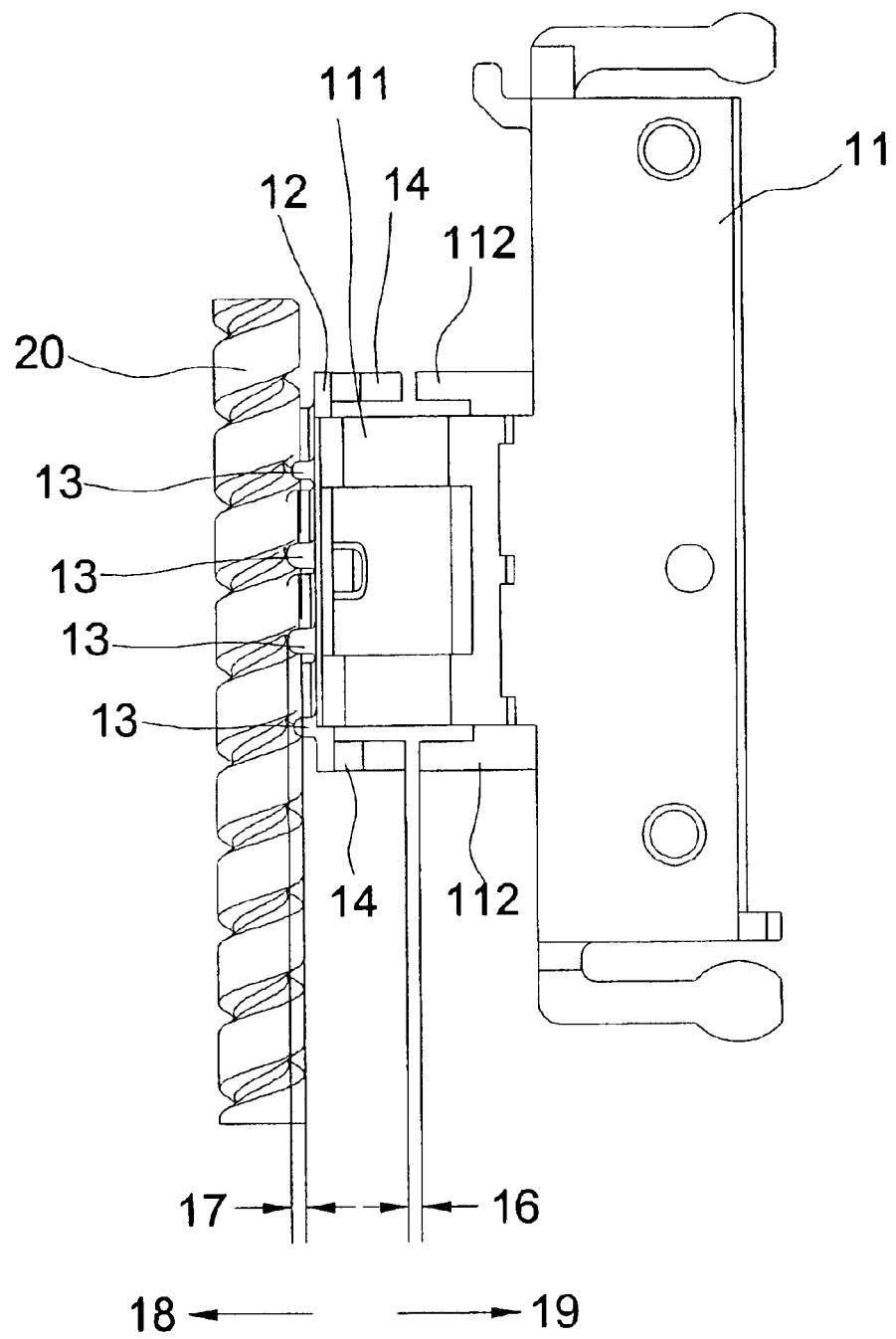
FIG. 2b is a front view of an exemplary connecting unit and an exemplary lead screw.
Figure 2C:
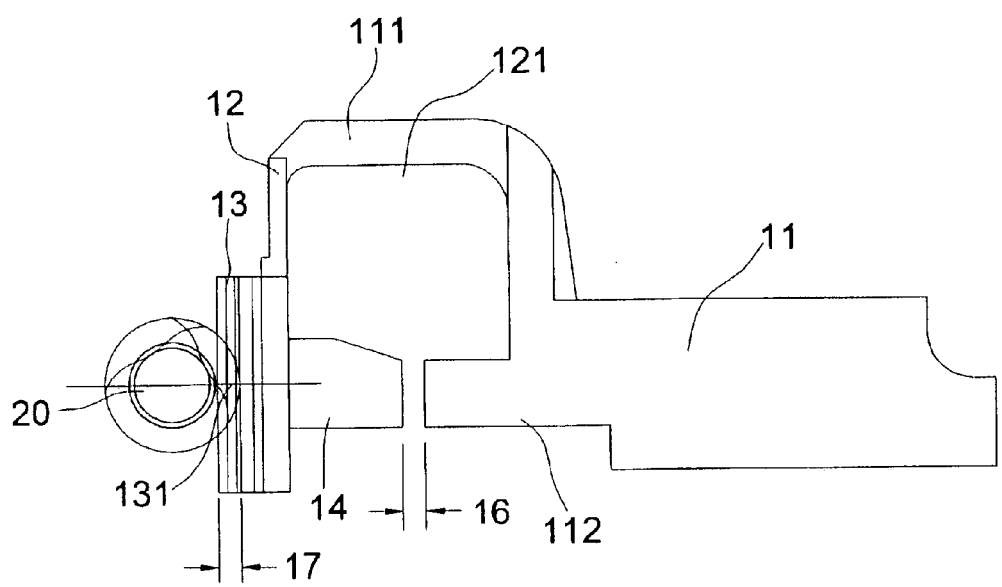
FIG. 2c is a side view of an exemplary connecting unit and an exemplary lead screw.

Referring to FIGS. 2a, 2b and 2c, the connecting unit 10 includes a main portion 11, an elastic portion 12, a tooth-like portion 13, a restriction portion 14, an extending portion 111 and a limiting portion 112. The extending portion 111 extends from the main portion 11 along a first direction 18 as shown in the figures. The elastic portion 12 extends from the extending portion 111. And, a space 121 is formed between the elastic portion 12 and the main portion 11. The tooth-like portion 13 extends from the elastic portion 12 along the first direction 18. The limiting portion 112 extends from the main portion 11 along the first direction 18. The restriction portion 14 extends from the elastic portion 12 along a second direction 19 opposite to the first direction 18. The restriction portion 14 corresponds to the limiting portion 112. Accordingly, the restriction portion 14 limits the elastic portion 12 to move within a range of a first value 16 along the second direction 19.

The lead screw 20 engages with the tooth-like portion 13 at a first position 131, which corresponds to the center of the lead screw 20, as shown in FIG. 2c. The lead screw 20 drives and guides the connecting unit 10 to move along the lead screw 20. A maximum engagement depth between the lead screw 20 and the tooth-like portion 13 is a second value 17. The second value 17 is larger than the first value 16 to prevent the lead screw 20 and the tooth-like portion 13 from disengagement.

Figure 3:
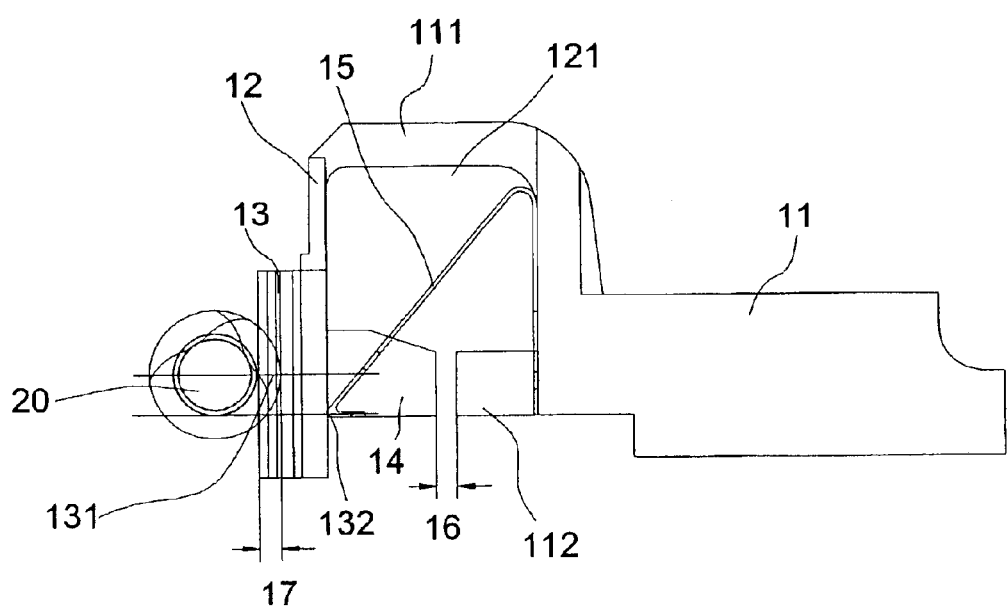
FIG. 3 is a side view of an exemplary connecting unit, an exemplary elastic unit and an exemplary lead screw.
Figure 4:
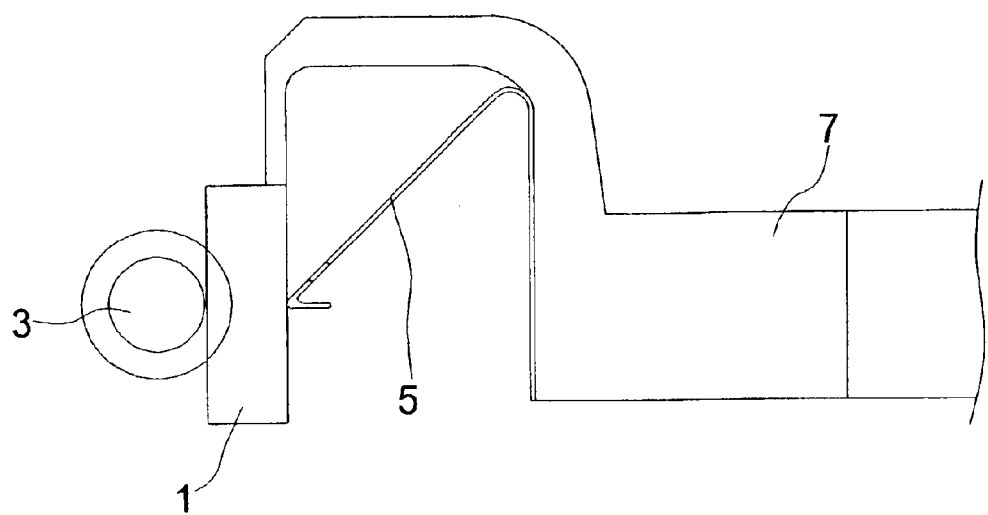
FIG. 4 is a side view of an exemplary connecting unit and an exemplary lead screw of a prior art.

Referring to FIG. 3, the present invention further includes an elastic unit 15 disposed within the space 121. The elastic unit 15 provides a force to the tooth-like portion 13 at a second position 132 such that the tooth-like portion 13 keeps engaging with the lead screw 20. It notes that the height of the second position 132 is lower than the height of the first position 131. In other words, the perpendicular distance between the expending portion 111 and the second position 132 is larger than the perpendicular distance between the expending portion 111 and the first position 131.

Accordingly, under the same force, the torque of the lead screw 20 applying to the tooth-like portion 13 is smaller than the torque of the elastic unit 15 applying to the tooth-like portion 13. Therefore, the elastic unit 15 resists the force from the lead screw 20 along the second direction 19 to enable the engagement between the tooth-like portion 13 and the lead screw 20.

The tooth-like portion 13 includes at least three teeth aligning to each other and having two outer teeth and at least one inner tooth. The length of either of the two outer teeth is shorter than the length of the at least one inner tooth, as shown in the FIGS. 2a and 2b. Besides, although tooth at either outer side is shorter, it should still engage with the lead screw 20. Generally, oil is used to lubricate between the tooth-like portion 13 and the lead screw 20. Therefore, the tooth at either outer side can apply the oil uniformly on the lead screw 20 so that the housing 40 moves smoothly along the lead screw 20.

As foregoing, the elastic unit 15 of the present invention includes a flexible plate. However, various changes may be made in the design and arrangement of the elements described in the exemplary embodiments herein without departing from the scope of the invention as set forth in the appended claims, such as a spring.

Figure 5:
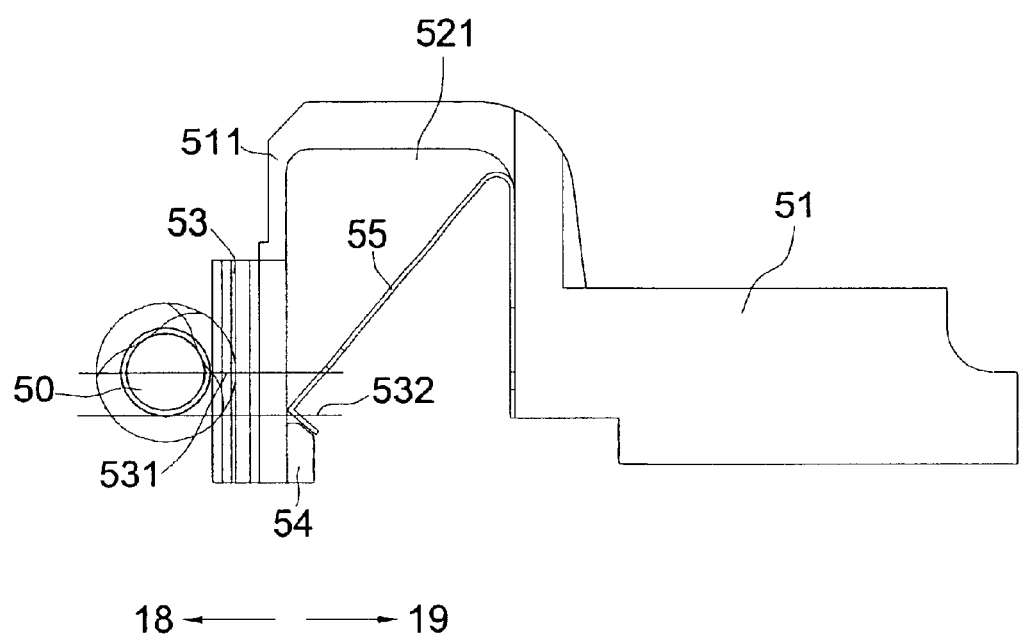
FIG. 5 is a side view of an exemplary optical pick-up supporting apparatus.

FIG. 5 is a side view of an exemplary optical pick-up supporting apparatus. The connecting unit of this embodiment has a main portion 51, an extended portion 511, and a tooth-like portion 53. The extended portion 511 is deformable and elastically connected to the main portion 51. A space 521 is formed between the extended portion 511 and the main portion 51. The size of space 521 is adjusted when the extended portion 511 deforms. The tooth-like portion 53 protrudes from the extended portion 511. The lead screw 50 engages with the tooth-like portion 53 and rotates to drive the optical pick-up supporting apparatus. The elastic member 55 is disposed within the space 521. And the elastic member 55 applies a force onto the extended portion 511. Therefore the lead screw 50 and the tooth-like portion 53 keep engaging with each other while experiencing bigger shake or impact. The connecting unit further includes a fixing device 54. The fixing device 54 protrudes from the extended portion 511 and blocks the elastic member 55. Therefore the fixing device 54 allows the elastic member 55 to keep pressing against the extended portion 511.

As foregoing, the elastic member 55 of the present invention includes a flexible plate. However, various changes may be made in the design and arrangement of the elements described in the exemplary embodiments herein without departing from the scope of the invention as set forth in the appended claims, such as a spring.

Those skilled in the art will readily observe that numerous modifications and alterations of the device may be made within the teaching of the invention. Accordingly, the above disclosure should be construed as limited only by the metes and bounds of the appended claims.

We claim:

1. An apparatus for connecting a transmission device to an optical pick-up, said transmission device including a lead screw and a driving unit for driving said lead screw to rotate, said optical pick-up being disposed in a housing, said housing being connected with and movable by said apparatus, said apparatus comprising:

a main portion having an extending portion;

an elastic portion extending from said extending portion such that a space is formed between said elastic portion and said main portion;

a tooth-like portion extending from said elastic portion along a first direction; and a restriction portion extending from said elastic portion to limit said elastic portion to move within a range of a first value along a second direction opposite to said first direction;

wherein, said lead screw drives and guides said apparatus to move along said lead screw, and said lead screw engages with said tooth-like portion at a first position, and maximum engagement depth between said lead screw and said tooth-like portion is a second value larger than said first value.

2. The apparatus according to claim 1 further comprising an elastic unit disposed within said space for providing a force to said tooth-like portion at a second position such that said tooth-like portion engages with said lead screw, wherein, the perpendicular distance between said extending portion and said second position is larger than the perpendicular distance between said extending portion and said first position.

3. The apparatus according to claim 2, wherein said elastic unit includes a flexible plate.

4. The apparatus according to claim 2, wherein said elastic unit includes a spring.

5. The apparatus according to claim 1, wherein said tooth-like portion includes at least three teeth aligning to each other and having two outer teeth and at least one inner tooth, and the length of either of the two outer teeth is shorter than the length of the at least one inner tooth.

6. An apparatus for driving an optical pick-up, said apparatus comprising:

a connecting unit, said connecting unit including:

a main portion having an extending portion;

an elastic portion extending from said extending portion such that a space is formed between said elastic portion and said main portion;

a tooth-like portion extending from said elastic portion along a first direction; and a restriction portion extending from said elastic portion to limit said elastic portion to move within a range of a first value along a second direction opposite to said first direction;

a housing connected to said connecting unit for supporting said optical pick-up;

a lead screw for engaging with said tooth-like portion at a first position to guide said connecting unit to move, wherein, engagement depth between said lead screw and said tooth-like portion is a second value larger than said first value;

a driving unit for driving said lead screw to rotate; and an elastic unit disposed within said space to provide a force to said tooth-like portion at a second position such that said tooth-like portion engages with said lead screw, wherein the perpendicular distance between said expending portion and said second position is larger than the perpendicular distance between said expending portion and said first position.

7. The apparatus according to claim 6, wherein said tooth-like portion includes at least three teeth aligning to each other and having two outer teeth and at least one inner tooth, and the length of either of the two outer teeth is shorter than the length of the at least one inner tooth.

8. The apparatus according to claim 6, wherein said elastic unit includes a spring.

9. The apparatus according to claim 6, wherein said elastic unit includes a flexible plate.

10. An apparatus for supporting an optical pick-up, said apparatus having:

a connecting unit, said connecting unit comprising:

a main portion;

a deformable extended portion elastically connected to said main portion, wherein a space is formed between said extended portion and said main portion, a size of said space is adjusted when said extended portion deforms;

a tooth-like portion protruded from said extended portion;

a lead screw engaging with said tooth-like portion;

an elastic member disposed within said space for applying a force onto said extended portion to maintain said tooth-like portion engaging with said lead screw; and a fixing device protruded from said extended portion and blocking said elastic member, wherein said fixing device allows said elastic member to keep pressing against said extended portion.

11. The apparatus according to claim 10 wherein said elastic member includes a spring.

12. The apparatus according to claim 10 wherein said elastic member includes a flexible plate.

13. An apparatus for supporting an optical pick-up, said apparatus having:

a connecting unit, said connecting unit comprising:

a main portion;

a deformable extended portion elastically connected to said main portion, wherein a space is formed between said extended portion and said main portion, a size of said space is adjusted when said extended portion deforms;

a tooth-like portion protruded from said extended portion;

a lead screw engaging with said tooth-like portion; and an elastic member disposed within said space for applying a force onto said extended portion to maintain said tooth-like portion engaging with said lead screw, wherein said tooth-like portion includes at least three teeth aligning to each other, and having two outer teeth and at least one inner tooth, and the length of either of the two outer teeth is shorter than the length of the at least one inner tooth.

14. The apparatus according to claim 13, wherein said elastic member includes a spring.

15. The apparatus according to claim 13, wherein said elastic member includes a flexible plate.

* * * * *